US 8,238,034 B2

(12) United States Patent  (10) Patent No.: US 8,238,034 B2
Cho  (45) Date of Patent: Aug. 7, 2012

(54) VARIFOCAL LENS AND IMAGING APPARATUS INCLUDING THE SAME

(75) Inventor: Sung Nae Cho, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 228 days.

(21) Appl. No.: 12/547,996

(22) Filed: Aug. 26, 2009

(65) Prior Publication Data

US 2010/0110560 A1  May 6, 2010

(30) Foreign Application Priority Data

Oct. 31, 2008  (KR) .................. 10-2008-0107972

(51) Int. Cl.
*G02B 3/12* (2006.01)
(52) U.S. Cl. .................. 359/666; 359/665; 359/667
(58) Field of Classification Search .......... 359/665–667; 385/33

See application file for complete search history.

(56) References Cited

U.S. PATENT DOCUMENTS

| 6,747,806 | B2 * | 6/2004 | Gelbart ................. 359/666 |
| 7,215,480 | B2 * | 5/2007 | Ito et al. ................ 359/666 |
| 7,245,440 | B2 | 7/2007 | Pesux |
| 7,256,943 | B1 | 8/2007 | Kobrin et al. |
| 7,369,723 | B1 * | 5/2008 | Mescher ................ 385/33 |
| 7,672,059 | B2 * | 3/2010 | Batchko et al. ........... 359/666 |
| 7,813,047 | B2 * | 10/2010 | Wang et al. ............. 359/665 |
| 2008/0137213 | A1 | 6/2008 | Kuiper et al. |

FOREIGN PATENT DOCUMENTS

| JP | 07-049404 A | 2/1995 |
| JP | 11-133210 A | 5/1999 |
| JP | 2000-081503 A | 3/2000 |
| KR | 10-2006-0134819 A | 12/2006 |
| KR | 10-2007-0030957 A | 3/2007 |

OTHER PUBLICATIONS

Ulaby, Fawwaz T. Fundamentals of Applied Electromagnetics. Upper Saddle River, NJ: Prentice Hall, 2001. p. 7. Print.*

* cited by examiner

*Primary Examiner* — Ricky Mack
*Assistant Examiner* — Zachary Wilkes
(74) *Attorney, Agent, or Firm* — Sughrue Mion, PLLC (57) ABSTRACT

Provided are a varifocal lens having a focal length that may be electrically controlled, and an imaging apparatus including focal length. Varifocal lens includes fluid sealed between two transparent flexible layers. An upper flexible layer is supported by support plate having opening having a lens shape, and vacuum is maintained on upper flexible layer. Portion of lower flexible layer, which faces opening having a lens shape, is fixed by a fixation plate, and a chamber having a predetermined space is formed below the lower flexible layer so as to surround a portion corresponding to the opening having the lens shape. Charged particles are positioned in the chamber. In the varifocal lens, when the charged particles are moved by an electrical field generated in the chamber to compress the lower flexible layer, a lens region of the upper flexible layer protrudes in an upper direction so as to obtain refractive power.

20 Claims, 6 Drawing Sheets

VARIFOCAL LENS AND IMAGING APPARATUS INCLUDING THE SAME

CROSS-REFERENCE TO RELATED APPLICATIONS

This application claims the benefit of Korean Patent Application No. 10-2008-0107972, filed on Oct. 31, 2008, in the Korean Intellectual Property Office, the disclosure of which is incorporated herein in its entirety by reference.

BACKGROUND

1. Field

One or more exemplary embodiments of the present invention relate to a varifocal lens having a focal length that may be electrically controlled, and an imaging apparatus including the varifocal lens.

2. Description of the Related Art

A varifocal lens may continually vary its focal length. Generally, a varifocal lens includes a plurality of lens elements, and may vary its focal length by changing relative positions of the lens elements. Such a varifocal lens having many lens elements is relatively large and heavy, and the varifocal lens needs driving devices for controlling the respective lens elements.

Recently, the need for a zoom system has arisen in small-sized cameras integrated with mobile devices such as cellular phones, personal digital assistants (PDAs), and notebook computers. However, it is difficult to use a varifocal lens including many lens elements in such a small-sized camera. It may be convenient to use a single lens element having a variable focal length in a zoom system of a small-sized camera. Thus, research has been conducted into a varifocal lens using a material such as a liquid crystal whose refractive index may be changed by electrically controlling the liquid crystal.

SUMMARY

One or more embodiments include a varifocal lens having a focal length that may be electrically controlled.

One or more embodiments include an imaging apparatus including the varifocal lens.

Additional aspects will be set forth in part in the description which follows and, in part, will be apparent from the description, or may be learned by practice of the presented exemplary embodiments.

To achieve the above and/or other aspects, one or more embodiments may include a varifocal lens including a first electrode; a first frame that is transparent and disposed on the first electrode; first and second transparent flexible layers that are sequentially disposed on the first frame and spaced an interval apart; a transparent fluid sealed in the interval between the first and second transparent flexible layers; a second electrode spaced apart from and disposed on the second transparent flexible layer; at least one chamber formed in the first frame so as to have a space, wherein an upper surface of the at least one chamber is open towards the first transparent flexible layer; and a charged particle disposed in the at least one chamber and electrically charged.

The varifocal lens may further include a support plate supporting the second transparent flexible layer and including an opening formed in a central portion of the support plate, wherein a central portion of the second transparent flexible layer, corresponding to the opening of the support plate, may form a lens region that is not fixed by the support plate and may be capable of freely moving.

The at least one chamber disposed in the first frame may be disposed to surround a portion corresponding to an edge of the lens region. The at least one chamber may be disposed around a central axis of the lens region at predetermined intervals along an azimuthal direction.

The varifocal lens may further include a fixation plate having a ring shape and fixing a portion of the first transparent flexible layer, corresponding to an edge of the lens region.

The first electrode and the second electrode may each be formed of a transparent material.

An opening may be formed in each of central portions of the first electrode and the second electrode.

The varifocal lens may further include a second frame and a sealing member, which surround a side surface of the transparent fluid in order to seal the transparent fluid between the first and second transparent flexible layers.

A vacuum may be maintained in a space between the second transparent flexible layer and the second electrode, and a vacuum may be sealed between the second transparent flexible layer and the second electrode by a third frame.

A single charged particle or a plurality of charged particles that are charged with the same polarity may be positioned in the at least one chamber.

A fine through hole may be formed in a bottom of the at least one chamber, which is a portion of the first frame.

The transparent fluid may include a transparent gas or liquid having a higher refractive index than that of air.

To achieve the above and/or other aspects, one or more embodiments may include a varifocal lens including a first electrode; a first frame that is transparent and disposed on the first electrode; first and second transparent flexible layers that are sequentially disposed on the first frame and spaced an interval apart; a transparent fluid sealed between the first and second transparent flexible layers; a second electrode spaced apart from and disposed on the second transparent flexible layer; at least one chamber formed in the first frame so as to have a space, wherein an upper surface of the at least one chamber is open towards the first transparent flexible layer; and a charged particle embedded in a portion of the first transparent flexible layer, which corresponds to an upper portion of the at least one chamber, and electrically charged.

To achieve the above and/or other aspects, one or more embodiments may include imaging apparatus including the above described varifocal lens.

BRIEF DESCRIPTION OF THE DRAWINGS

These and/or other aspects will become apparent and more readily appreciated from the following description of the exemplary embodiments, taken in conjunction with the accompanying drawings of which.

DETAILED DESCRIPTION

Reference will now be made in detail to exemplary embodiments, examples of which are illustrated in the accompanying drawings, wherein like reference numerals refer to like elements throughout. In the drawings, the sizes of elements are exaggerated for clarity.

Figure 1:
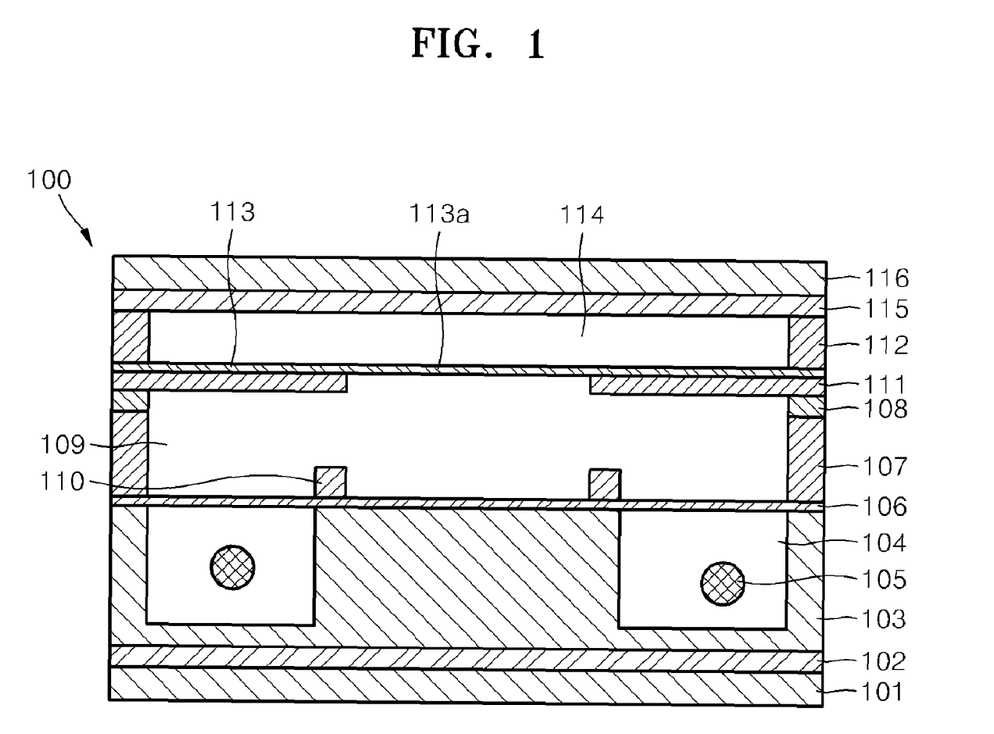
FIG. 1 is a cross-sectional view of a varifocal lens according to an exemplary embodiment.

FIG. 1 is a cross-sectional view of a varifocal lens 100 according to an exemplary embodiment. Referring to FIG. 1, the varifocal lens 100 includes a fluid 109 sealed between upper and lower transparent flexible layers 106 and 113 that are spaced a predetermined interval apart. The fluid 109 may transmit light, and may include a transparent liquid or gas having a higher refractive index than that of air. The upper and lower transparent flexible layers 106 and 113 may transmit light, and may be formed of a flexible material so as to be elastic and flexible. For example, the upper and lower transparent flexible layers 106 and 113 may be formed of polydimethylsiloxane (PDMS) that is an organic polymer. Alternatively, the upper and lower transparent flexible layers 106 and 113 may be formed of various other transparent and flexible materials. The upper transparent flexible layer 113 is supported by a support plate 111. An opening having a predetermined shape is formed in a central portion of the support plate 111. Thus, a central portion of the upper transparent flexible layer 113, which corresponds to the opening of the support plate 111, may be movable rather than being fixed. The central portion of the upper transparent flexible layer 113 constitutes a lens region 113a. In FIG. 1, the support plate 111 is disposed below the upper transparent flexible layer 113. However, alternatively, the support plate 111 may be disposed on the upper transparent flexible layer 113. The fluid 109 is sealed between the upper transparent flexible layer 113 and the lower transparent flexible layer 106 by an intermediate frame 107 and a sealing member 108, which surround a side surface of the fluid 109.

A vacuum 114 is maintained in a space between the upper transparent flexible layer 113 and an upper electrode 115. The vacuum 114 is maintained by being completely sealed in by the upper transparent flexible layer 113 disposed below the vacuum 114, an upper frame 112 surrounding a side surface of a space between the upper transparent flexible layer 113 and the upper electrode 115, and the upper electrode 115 spaced apart from and disposed on the upper transparent flexible layer 113. Since the vacuum 114 is maintained above the upper transparent flexible layer 113, it is easy to make the lens region 113a of the upper transparent flexible layer 113 protrude towards the vacuum 114, but it is difficult to make the lens region 113a of the upper transparent flexible layer 113 cave away from the vacuum 114. The upper electrode 115 may be, for example, a transparent electrode such as an indium tin oxide (ITO) electrode. Alternatively, the upper electrode 115 may be formed of an opaque material such as metal. In this case, an opening is formed in a central portion of the upper electrode 115 as well as in the support plate 111, which corresponds to the lens region 113a. A transparent upper substrate 116 is disposed on the upper electrode 115.

A portion of the lower transparent flexible layer 106, which corresponds to an edge of the lens region 113a, is fixed by a fixation plate 110 having a ring shape. Thus, a central portion of the lower transparent flexible layer 106, which faces the lens region 113a, may not be moved. A lower frame 103 formed of a transparent material is disposed below the lower transparent flexible layer 106. A plurality of chambers 104 each having a predetermined space are formed in the lower frame 103 to surround a portion corresponding to an edge of the lens region 113a. Upper portions of the chambers 104 formed in the lower frame 103 are open towards the lower transparent flexible layer 106. Thus, portions of the lower transparent flexible layer 106, which are in contact with the upper portions of the chambers 104, may freely move.

A charged particle 105 that is electrically charged is positioned in the chamber 104. The charged particle 105 may have, for example, a spherical shape, and may have a positive (+) or negative (−) charge. The charged particle 105 may be obtained by charging a fine metallic sphere formed of, for example, aluminum. The electrical charge state of the charged particle 105 may be maintained in the chambers 104. Thus, there may be no other particle or gas having an electric charge in the chambers 104. In particular, since oxygen easily reacts with a particle having a positive (+) charge, oxygen may be removed in the chambers 104. To achieve this, a vacuum may also be maintained in the chambers 104. Alternatively, the chambers 104 may be filled with inert or noble gases such as argon (Ar). As another alternative, the chambers 104 may be filled with air that does not contain oxygen. Also, the inner surfaces of the chambers 104, in which the charged particle 105 reside, may treated to be charged so that the charged particle 105 is repelled from the inner surfaces.

A lower electrode 102 may be disposed below the lower frame 103. The lower electrode 102 may be, for example, an ITO electrode. Alternatively, the lower electrode 102 may be formed of an opaque material such as metal. In this case, an opening is formed in a central portion of the lower electrode 102 as well as in the support plate 111, which corresponds to the lens region 113a. A transparent lower substrate 101 is disposed below the lower electrode 102.

Figure 2:
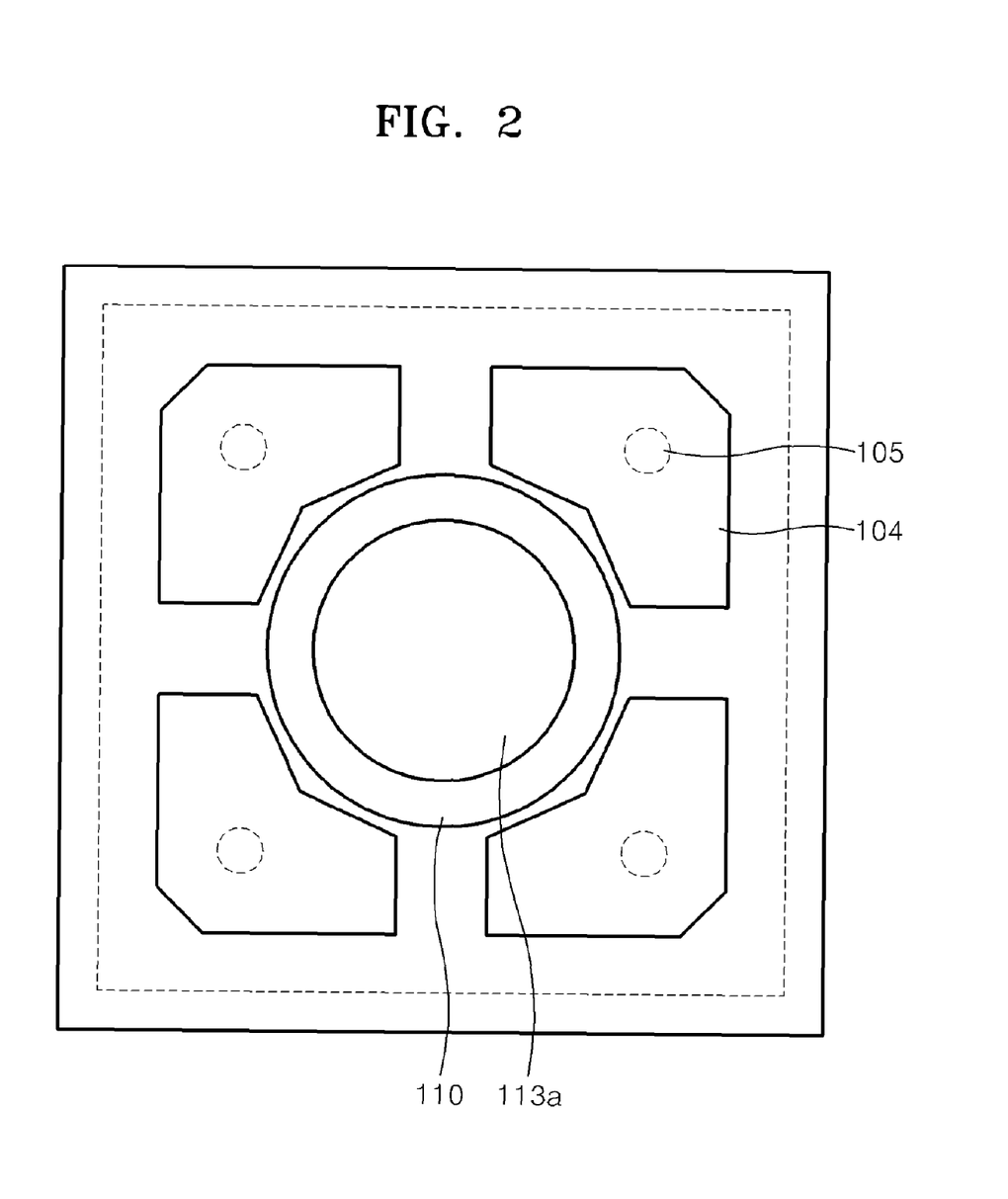
FIG. 2 is a top view of the varifocal lens of FIG. 1.

FIG. 2 is a top view of the varifocal lens 100 of FIG. 1. Referring to FIG. 2, the fixation plate 110 fixing the central portion of the lower transparent flexible layer 106 may have a ring shape surrounding a portion corresponding to an edge of the lens region 113a. In addition, the chambers 104 are formed in the lower frame 103 so as to surround a portion of an edge of the lens region 113a. A single charge particle 105 is disposed in each of the chambers 104. In FIG. 2, four chambers 104 are illustrated. However, the number of the chambers 104 may be changed, if necessary. The chambers 104 may be disposed around a central axis of the lens region 113a at predetermined intervals along an azimuthal direction.

Figure 3:
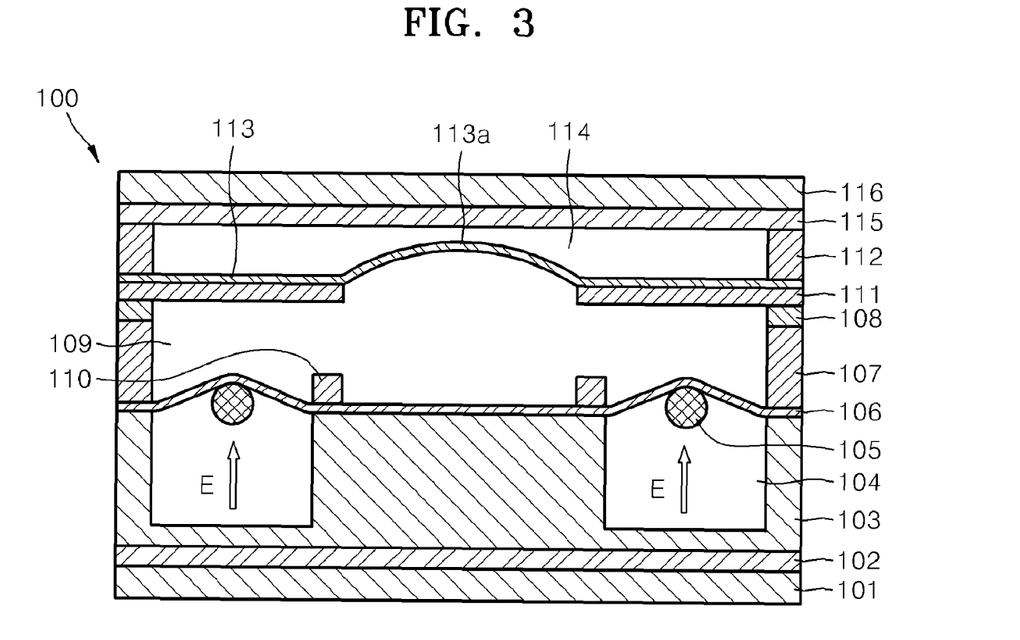
FIG. 3 is a cross-sectional view for illustrating an operation of the varifocal lens of FIG. 1.

FIG. 3 is a cross-sectional view for illustrating an operation of the varifocal lens 100 of FIG. 1. Referring to FIG. 3, when a voltage is applied to the lower electrode 102 and the upper electrode 115, an electric field E is generated between the lower electrode 102 and the upper electrode 115. For example, when the upper electrode 115 is connected to ground, and a positive (+) voltage is applied to the lower electrode 102, an electric field E having a direction from bottom to top is generated. At this time, when the charged particle 105 has a positive (+) charge, the charged particle 105 moves in an upper direction along a direction of the electric field E so as to push the lower transparent flexible layer 106. Then, the lower transparent flexible layer 106 is pushed to an upper direction by the charged particle 105, thereby increasing a pressure of the fluid 109. Thus, the lens region 113a of the upper transparent flexible layer 113 is deformed to be convex due to the increased pressure of the fluid 109. As a result, light transmitted through the varifocal lens 100 may be refracted. Then, when application of a voltage to the lower electrode 102 and the upper electrode 115 is stopped, the charged particle 105 moves in a lower direction in the chamber 104 due to gravity. Thus, since the lower transparent flexible layer 106 and the upper transparent flexible layer 113 become flat due to an elastic restoring force, light may be transmitted through the varifocal lens 100 without being refracted.

At this time, a refractive power and a focal length of the upper varifocal lens 100 are determined according to a degree of protrusion of the lens region 113a. For example, as the degree of protrusion of the lens region 113a is increased, the refractive power of the varifocal lens 100 is increased, and the focal length of the varifocal lens 100 is reduced. On the other hand, as the degree of protrusion of the lens region 113a is reduced, the refractive power of the varifocal lens 100 is reduced, and the focal length of the varifocal lens 100 is increased. The degree of protrusion of the lens region 113a may be determined according to a potential difference between the lower electrode 102 and the upper electrode 115. As the potential difference between the lower electrode 102 and the upper electrode 115 is further increased, since the charged particle 105 exerts a stronger force on the lower transparent flexible layer 106 while the intensity of the electric field E is increased, the lens region 113a further protrudes, thereby reducing the focal length of the varifocal lens 100.

With regard to the varifocal lens 100, when the size of the lens region 113a is much smaller than the sizes of the lower transparent flexible layer 106 and the upper transparent flexible layer 113, the lens region 113a may be significantly moved even by a little movement of the lower transparent flexible layer 106. For example, the lower transparent flexible layer 106 and the upper transparent flexible layer 113 may each be configured to have an entire planar size of about 5 mm×5 mm, and the lens region 113a may have a diameter "r" in the range of about 1 to about 1.5 mm. When four chambers 104 are disposed around the lens region 113a, even if the lower transparent flexible layer 106 moves by about 1 μm, the lens region 113a of the upper transparent flexible layer 113 may move by about 10 μm. Thus, even a low voltage of about 2 V may be used to drive the varifocal lens 100, and the power consumption of the varifocal lens 100 may be reduced.

When the varifocal lens 100 is used in, for example, a small-sized imaging device embedded in a mobile apparatus, etc., a zooming operation may be performed only by a single varifocal lens 100 instead of a plurality of lens elements having complicated configurations. In addition, since only a small amount of power is consumed when performing the zooming operation, the overall power of the imaging device or the mobile apparatus including the imaging device is barely affected by the power for performing the zooming operation.

Figure 4:
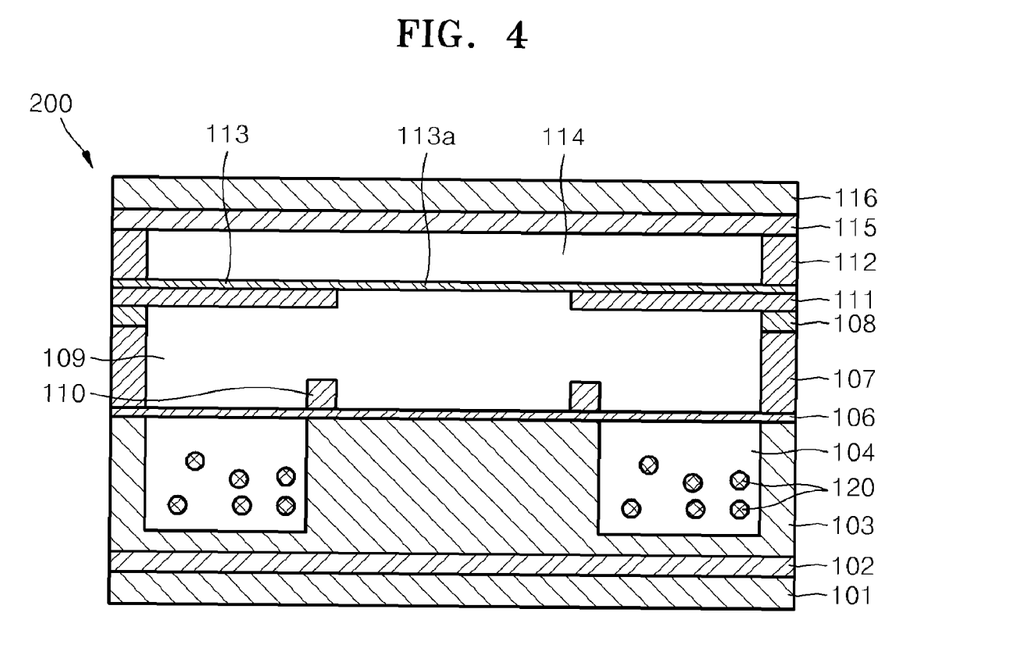
FIG. 4 is a cross-sectional view of a varifocal lens according to another exemplary embodiment.

FIG. 4 is a cross-sectional view of a varifocal lens 200 according to another exemplary embodiment. When the varifocal lens 200 is compared to the varifocal lens 100 of FIG. 1, the varifocal lens 200 is different from the varifocal lens 100 in that a plurality of charged particles 120 having the same polarity, instead of the charged particle 105, are positioned in the chamber 104 in FIG. 4. For example, in FIG. 1, the single charged particle 105 having a diameter in the range of about 100 nm to about 1 μm is positioned in the chamber 104. On the other hand, in FIG. 4, the charged particles 120 each having a diameter, for example, in the range of about 1 to about 100 nm, may be positioned in the chamber 104. At this time, since the charged particles 120 positioned in the chamber 104 are charged with the same polarity, the charged particles repel each other due to a repulsive force. Thus, the charged particles 120 are regularly distributed. Other remaining aspects of the configuration of the varifocal lens 200 are the same as the varifocal lens 100 of FIG. 1.

Figure 5:
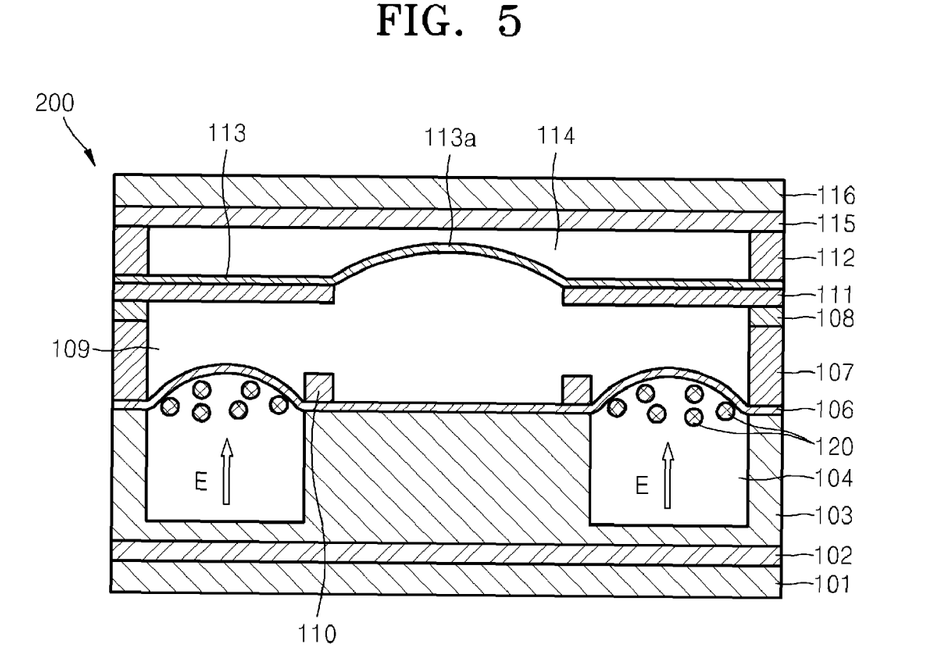
FIG. 5 is a cross-sectional view for illustrating an operation of the varifocal lens of FIG. 4.

FIG. 5 a cross-sectional view for illustrating an operation of the varifocal lens 200 of FIG. 4. As described with reference to FIG. 3, when a voltage is applied to the lower electrode 102 and the upper electrode 115, an electric field E is generated between the lower electrode 102 and the upper electrode 115. The charged particles 120 positioned in the chamber 104 are moved towards the lower transparent flexible layer 106 along a direction of the electric field E. When the intensity of the electric field E is sufficiently stronger than a repulsive force between the charged particles 120, all of the charged particles 120 push the lower transparent flexible layer 106, and a focal length of the varifocal lens 200 is reduced. As the intensity of the electric field E is further reduced, some of the charged particles 120 separate from the lower transparent flexible layer 106 by a repulsive force. Thus, the focal length of the varifocal lens 200 is further increased. In addition, when application of a voltage to the lower electrode 102 and the upper electrode 115 is stopped, the charged particles 120 are uniformly distributed by a repulsive force in the chamber 104.

Thus, by adjusting the number of the charged particles 120 moving towards the lower transparent flexible layer 106 and the moving degree of the charged particles according to the intensity of the electric field E, the focal length of the varifocal lens 200 may be finely controlled. In particular, in the varifocal lens 200, since the charged particles 120 may be uniformly distributed by a repulsive force in the chamber 104 regardless of gravity, the charged particles 120 may operate without being effected by movement of the varifocal lens 200. For example, even if the varifocal lens 200 of FIG. 4 is inverted, the above-described operation may be performed.

Figure 6:
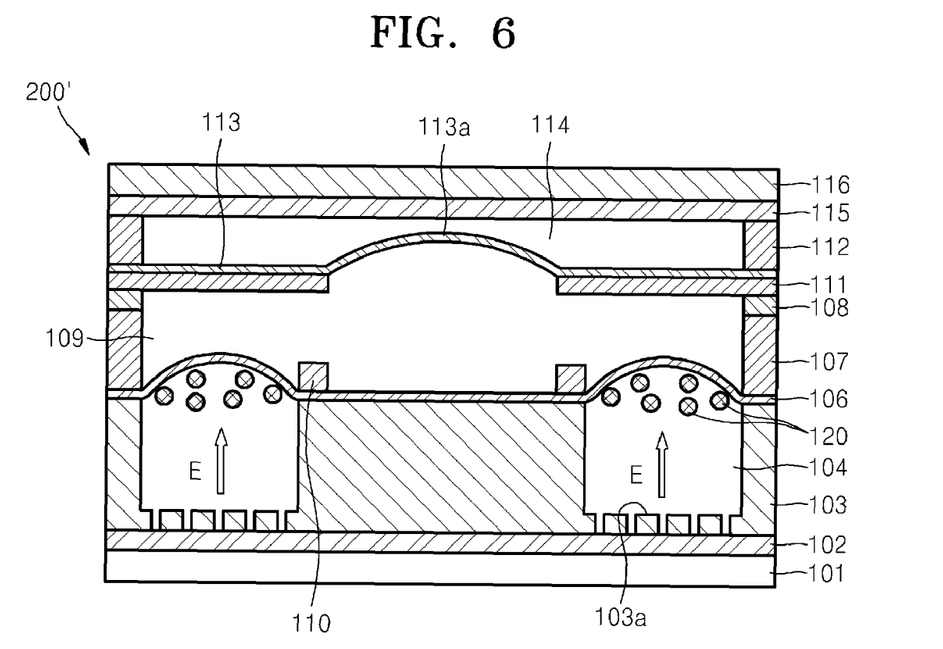
FIG. 6 is a cross-sectional view of a varifocal lens according to another exemplary embodiment.

FIG. 6 is a cross-sectional view of a varifocal lens 200' according to another exemplary embodiment. Referring to FIG. 6, a plurality of charge particles 120 may be formed by placing particles that are not electrically charged into the chamber 104, assembling the varifocal lens 200' and then electrically charging the particles. To achieve this, a plurality of fine through holes through which electrons may pass are formed in a bottom 103a of the chamber 104, which is a portion of the lower frame 103. Since each fine through hole is smaller than the diameter of each of the charged particles 120, the charged particles 120 are not in contact with the lower electrode 102, and only electrons from the charged particles 120 may pass through the fine through holes and then drain through the lower electrode 102. Other remaining aspects of the configuration of the varifocal lens 200', except for the fine through holes, are the same as the varifocal lens 200 of FIG. 4. A certain material may have natural holes through which electrons may pass. When such a material is used to form the lower frame 103, it is not necessary to form artificial through holes.

Particles that are not electrically charged may be electrically charged in the chamber 104 by using two methods. One method is a photoemission method using a photoelectric effect. For example, when ultraviolet (UV) light having a wavelength in the range of about 250 to about 300 nm is irradiated onto an aluminum particle, a single electron may be emitted from every aluminum atom of the aluminum particle. Thus, when the varifocal lens 200' is assembled, and then UV light having a wavelength in the range of about 250 to about 300 nm is irradiated onto the varifocal lens 200', the particles in the chamber 104 may be electrically charged. In this case, the lower substrate 101, the lower electrode 102, and the lower frame 103 may be formed of a material that is transparent with respect to UV light. Alternatively, when UV light is irradiated from the upper portion of the varifocal lens 200', the upper substrate 116, the upper electrode 115, the upper and lower transparent flexible layers 106 and 113, and the fluid 109 may be formed of a material that is transparent with respect to UV light. Once a single electron is emitted from an atom, a ray having a shorter wavelength than a wavelength in the range of about 250 to about 300 nm is necessary to emit an electron. Thus, the charged particles 120 are not additionally charged by UV light. When a positive (+) voltage is applied to the lower electrode 102 during the charging of the particles, electrons emitted from the charged particle 120 pass thorough a through hole formed in the bottom 103a, and then drain through the lower electrode 102.

Another method is a method in which particles are electrically charged by applying a high voltage between the lower electrode 102 and the upper electrode 115. For example, when a voltage in the range of about 100 to about 200 V is applied to the lower electrode 102, electron are emitted from a particle and drain through the lower electrode 102. Generally, the varifocal lens 200' may be driven by a voltage equal to or less than 2 V. Thus, once particles are charged to form the charged particles 120, it is not necessary to apply such a high voltage again.

Figure 7:
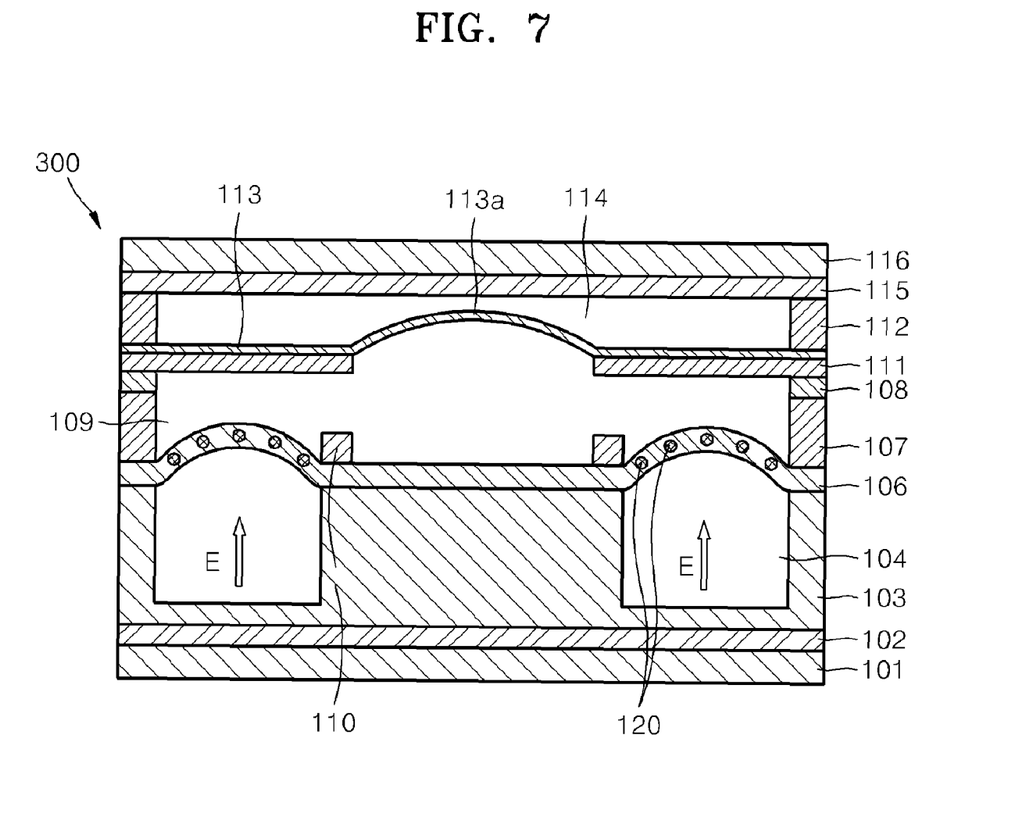
FIG. 7 is a cross-sectional view of a varifocal lens according to another exemplary embodiment.

FIG. 7 is a cross-sectional view of a varifocal lens 300 according to another exemplary embodiment. Referring to FIG. 7, charged particles 120 are embedded in a portion of the lower transparent flexible layer 106, which corresponds to an upper portion of the chamber 104, rather than being positioned in the chamber 104. Other remaining aspects of the configuration of the varifocal lens 300 are the same as the varifocal lens 200 of FIG. 4. In FIG. 7, since the charged particles 120 are moved along a direction of the electric field E, the lower transparent flexible layer 106 may move according to the movement of the charged particles 120. When the electric field E vanishes, the lower transparent flexible layer 106 is restored to an original state due to an elastic restoring force of the lower transparent flexible layer 106.

Figure 8:
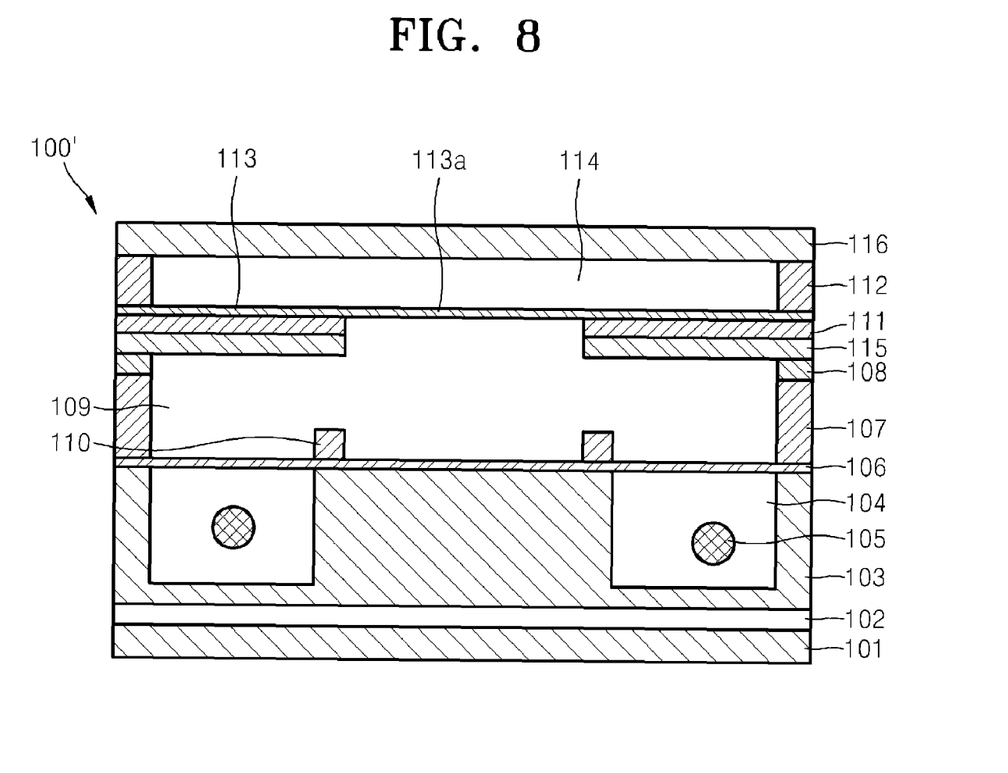
FIG. 8 is a cross-sectional view of a varifocal lens according to another exemplary embodiment.

FIG. 8 is a cross-sectional view of a varifocal lens 100' according to another exemplary embodiment. The varifocal lens 100' has the same structures as the varifocal lens 100 in FIG. 1 except for the position of the upper electrode 115. In aforementioned exemplary embodiments, the upper electrode 115 is disposed on a lower surface of the transparent upper substrate 116. It is known that if the gap between the upper electrode 115 and the lower electrode 102 is decreased, the less voltage may be required to generate same intensity of the electric field E. In this spirit, assuming that the fluid 109 does not electrically conductive, the upper electrode 115 may be repositioned to a lower surface of the support plate 111, as shown in FIG. 8. That is to say, the upper electrode 115 may be immersed in the fluid 109. Of course, this arrangement of the upper electrode 115 may be also applied to the other exemplary embodiments of FIGS. 4, 6 and 7.

It should be understood that the exemplary embodiments described herein should be considered in a descriptive sense only and not for purposes of limitation. Descriptions of features or aspects within each exemplary embodiment should typically be considered as available for other similar features or aspects in other embodiments.

What is claimed is:

1. A varifocal lens comprising:
   a first electrode;
   a first frame that is transparent and disposed on the first electrode;
   a first transparent flexible layer and a second transparent flexible layer that are sequentially disposed on the first frame and spaced an interval apart;
   a transparent fluid disposed in the interval between the first and the second transparent flexible layers;
   a second electrode spaced apart from and disposed on the second transparent flexible layer;
   at least one chamber formed in the first frame, wherein an upper surface of the at least one chamber is open towards the first transparent flexible layer; and
   a charged particle disposed in the at least one chamber and electrically charged,
   wherein a vacuum is maintained in a space between the second flexible layer and the second electrode.

2. The varifocal lens of claim 1, further comprising a support plate which supports the second transparent flexible layer and includes an opening formed in a central portion of the support plate, wherein a central portion of the second transparent flexible layer, corresponding to the opening of the support plate, forms a lens region that is not fixed by the support plate and is capable of freely moving.

3. The varifocal lens of claim 2, wherein the at least one chamber formed in the first frame is disposed to surround a portion corresponding to an edge of the lens region.

4. The varifocal lens of claim 3, wherein the at least one chamber is disposed around a central axis of the lens region at predetermined intervals along an azimuthal direction.

5. The varifocal lens of claim 2, further comprising a fixation plate having a ring shape and fixing a portion of the first transparent flexible layer, corresponding to an edge of the lens region.

6. The varifocal lens of claim 2, wherein the first electrode and the second electrode are each formed of a transparent material.

7. The varifocal lens of claim 2, wherein an opening is formed in a central portion of the first electrode and an opening is formed in a central portion of the second electrode.

8. The varifocal lens of claim 2, wherein the second electrode is disposed on the support plate so that the second electrode is immersed in the transparent fluid.

9. The varifocal lens of claim 1, further comprising a second frame and a sealing member, which surround a side surface of the transparent fluid to seal the transparent fluid between the first and the second transparent flexible layers.

10. The varifocal lens of claim 1, wherein a single charged particle or a plurality of charged particles that are charged with the same polarity are positioned in the at least one chamber.

11. The varifocal lens of claim 1, wherein a fine through hole is formed in a bottom of the at least one chamber, which is a portion of the first frame.

12. The varifocal lens of claim 1, wherein the transparent fluid comprises a transparent gas or a liquid having a higher refractive index than that of air.

13. The varifocal lens of claim 1, wherein the charged particle is disposed separately from the transparent fluid.

14. The varifocal lens of claim 1, wherein the transparent fluid is disposed outside of the chamber.

15. The varifocal lens of claim 1, wherein the charged particle is a metallic sphere.

16. The varifocal lens of claim 1, wherein a vacuum is formed in the at least one chamber.

17. A varifocal lens comprising:
   a first electrode;
   a first frame that is transparent and disposed on the first electrode;
   a first transparent flexible layer and a second transparent flexible layer that are sequentially disposed on the first frame and spaced an interval apart;
   a transparent fluid disposed in the interval between the first and the second transparent flexible layers;

a second electrode spaced apart from and disposed on the second transparent flexible layer;

at least one chamber formed in the first frame, wherein an upper surface of the at least one chamber is open towards the first transparent flexible layer; and a charged particle disposed in the at least one chamber and electrically charged, wherein a vacuum is maintained in a space between the second transparent flexible layer and the second electrode, and a vacuum is sealed between the second transparent flexible layer and the second electrode by a third frame.

18. A varifocal lens comprising:

a first electrode;

a first frame that is transparent and disposed on the first electrode;

a first transparent flexibly layer and a second transparent flexible layer that are sequentially disposed on the first frame and spaced an interval apart;

a transparent fluid disposed between the first and the second transparent flexible layers;

a second electrode spaced apart from and disposed on the second transparent flexible layer;

at least one chamber formed in the first frame, wherein an upper surface of the at least one chamber is open towards the first transparent flexible layer; and a charged particle embedded in a portion of the first transparent flexible layer, which corresponds to an upper portion of the at least one chamber, and electrically charged, wherein a vacuum is maintained in a space between the second flexible layer and the second electrode.

19. An imaging apparatus comprising a varifocal lens, wherein the varifocal lens comprises:

a first electrode;

a first frame that is transparent and disposed on the first electrode;

a first transparent flexibly layer and a second transparent flexible layer that are sequentially disposed on the first frame and spaced an interval apart;

a transparent fluid disposed in the interval between the first and the second transparent flexible layers;

a second electrode spaced apart from and disposed on the second transparent flexible layer;

at least one chamber formed in the first frame, wherein an upper surface of the at least one chamber is open towards the first transparent flexible layer; and a charged particle disposed in the at least one chamber and electrically charged, wherein a vacuum is maintained in a space between the second flexible layer and the second electrode.

20. An imaging apparatus comprising a varifocal lens, wherein the varifocal lens comprises:

a first electrode;

a first frame that is transparent and disposed on the first electrode;

a first transparent flexible layer and a second transparent flexible layer that are sequentially disposed on the first frame and spaced an interval apart;

a transparent fluid disposed between the first and the second transparent flexible layers;

a second electrode spaced apart from and disposed on the second transparent flexible layer;

at least one chamber formed in the first frame, wherein an upper surface of the at least one chamber is open towards the first transparent flexible layer; and a charged particle embedded in a portion of the first transparent flexible layer, which corresponds to an upper portion of the at least one chamber, and electrically charged, wherein a vacuum is maintained in a space between the second flexible layer and the second electrode.

* * * * *